July 4, 1939.  M. L. FAST  2,164,451
INTERNAL COMBUSTION ENGINE WITH BLOWER
Filed Sept. 18, 1937
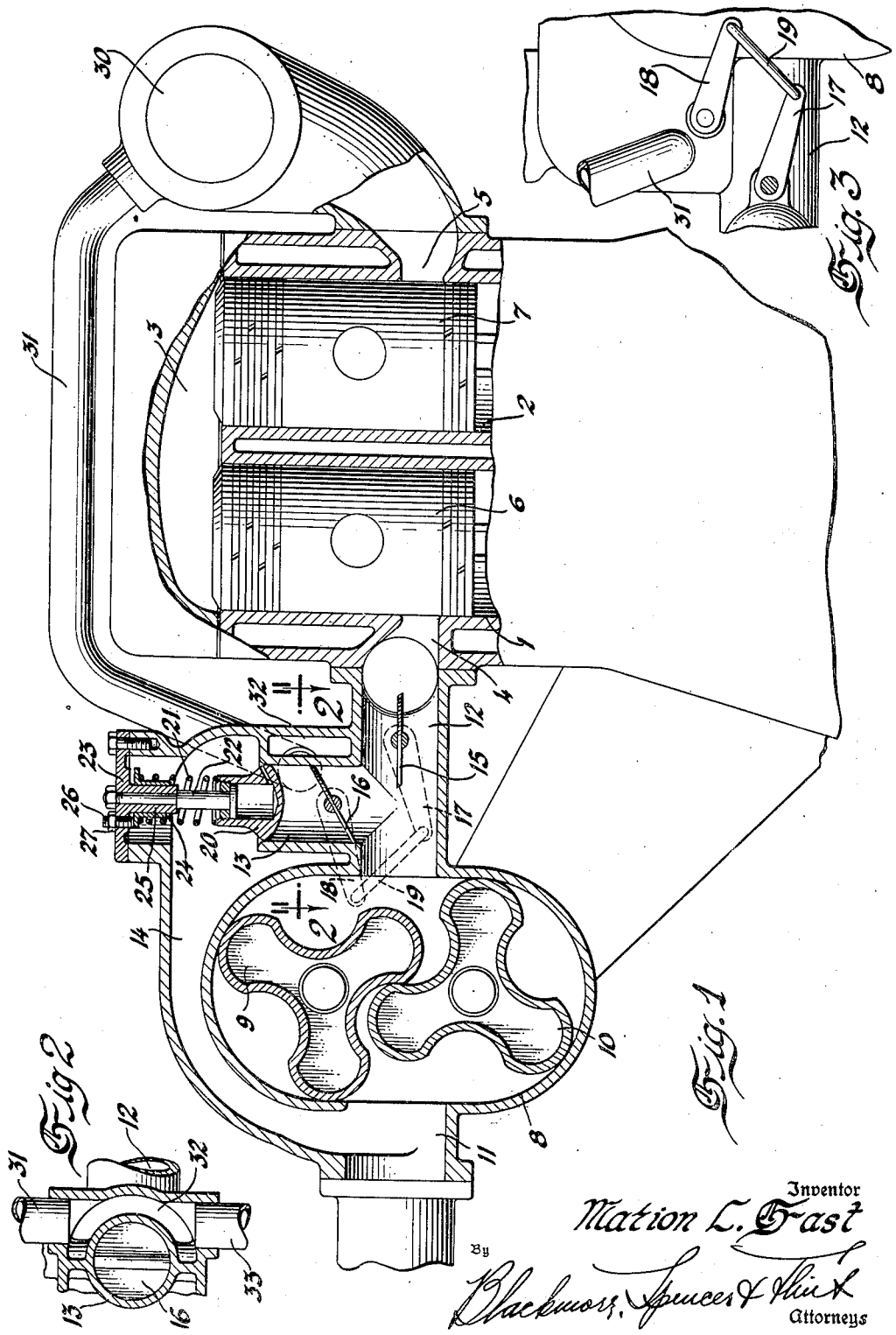
Inventor
Mation L. Fast
By
Blackmore, Spencer & Flint
Attorneys Patented July 4, 1939

2,164,451

UNITED STATES PATENT OFFICE 2,164,451

INTERNAL COMBUSTION ENGINE WITH BLOWER

Marion L. Fast, Detroit, Mich., assignor to General Motors Corporation, Detroit, Mich., a corporation of Delaware Application September 18, 1937, Serial No. 164,459

7 Claims. (Cl. 123—119)

This invention relates to internal combustion engines supplied with scavenging and/or charging air or mixture at super-atmospheric pressure.

It relates to such engines in which the quantity of air available from the blower is dependent on the speed of the engine, whereas the actual quantity required by the engine at any given speed is dependent on the load at that speed.

More specifically it relates to engine and blower combinations in which the excess of air available from the blower at lighter loads is bypassed to the inlet side of the blower, whereby the actual work done in driving the blower is proportional to the power developed by the engine.

It is well known that it is very desirable to preheat the intake air or mixture at lower loads if only in order to approximate the thermal conditions at greater loads and to secure smooth running and efficient combustion at the lower loads.

The object of the invention is a means of preheating the air supplied to the engine automatically to a degree varying approximately inversely as the load on the engine, at any given speed.

A more specific object of the invention is to provide an exhaust heated "hot spot" in the bypass passage of a bypass controlled blower.

The above and other objects of the invention will be apparent as the description proceeds.

The drawing shows the application of the invention to a U-type two cycle engine, having a positive displacement blower driven by the engine at a fixed speed ratio.

In the drawing

Fig. 1 is a sectional elevation of the engine through a pair of cylinder barrels united by a common combustion chamber and through the blower and parts according to the invention.

Fig. 2 is a section on line 2—2 of Fig. 1.

Fig. 3 is a rear elevation of a part of Fig. 1.

The engine includes a pair of cylinder barrels 1 and 2, having a common combustion chamber 3. The cylinder barrel 1 is provided with an inlet port 4, and the cylinder barrel 2 is provided with an exhaust port 5. The ports 4 and 5 are controlled respectively by the pistons 6 and 7.

Driven from the engine at a fixed speed ratio is the blower 8 having three lobed rotors 9 and 10. The inlet 11 to the blower may be connected to a carburetor (not shown).

The outlet side of the blower is connected to the engine inlet port 4 by a pipe 12, which has a branch 13 opening into a passage 14 connected to the inlet side of the blower and constituting a bypass from the outlet to the inlet side of the blower.

Within the pipe 12, at a point beyond the branch 13 and closer to the engine, is the engine butterfly throttle valve 15.

Within the branch 13 is a bypass throttle valve 16.

The throttle valves 15 and 16 are interconnected in such a way that as one is closed the other is opened, and vice versa. As shown, the operating levers 17 and 18 of the throttle valves 15 and 16, respectively, are interconnected by the link 19.

A spring loaded valve 20 is provided at the outlet of the branch 13 to ensure that, irrespective of the position of the throttle valves 15 and 16, no air or mixture is bypassed until the blower outlet pressure exceeds a certain minimum, determined by the closing pressure of the spring 21 on the valve 20.

The valve 20 is mushroom shaped, and slides on a guide stem 22 fixed in the cover flange 23 on the outer wall of the passage 14, at a point opposite the branch 13. The spring 21 has a seating 24 slidable on the boss 25 of the cover flange and provided with an adjustable abutment consisting of a screw 26 with a locknut 27, through which the pressure of spring 21, and hence the opening pressure of the valve 20, may be varied.

The exhaust port 5 is connected to an exhaust manifold 30. A pipe 31 carries hot exhaust gases from the manifold 30 to a jacket 32 around the branch 13, and thence through the pipe 33 to atmosphere or an exhaust silencer (not shown).

It will be seen, that the air or mixture which is recirculated through the blower when the bypass throttle is open, is heated as it passes the exhaust heated "hot spot"; that the quantity recirculated and heated at any given speed, (provided the blower pressure is sufficient to open the valve 20), is a maximum at low load when the engine throttle valve 15 is closed and the bypass throttle valve 16 is open, and is a minimum at full load when the engine throttle valve 15 is open and the bypass throttle valve 16 is closed.

While the heating jacket 32 has been shown as applied to that part of the bypass constituted by the branch 13, it will be appreciated that the invention is not restricted to such a placement of the heating jacket and that this may be applied to the walls of the bypass in any convenient place where it will heat the air recirculated therethrough as distinct from the air initially entering the blower inlet 11. It will also be appreciated that while the use of the valves 15, 16 and 20 is peculiar to the particular embodiment illustrated, the invention is not restricted to structures in which all or any of these valves are used, but is quite generally applicable to any engine and blower combination in which at part load, a part of the blower output is recirculated through the blower.

I claim:

1. In an internal combustion engine, in combination, a blower for supplying air under pressure to the engine, a bypass from the outlet to the inlet side of the blower, valve means for varying the effective output of the blower and the amount of air supplied to the engine by controlling the quantity of air returned through the bypass and re-circulated through the blower, the quantity of air supplied to the engine being reduced as the quantity of air re-circulated through the blower is increased and vice versa, and a hot spot in the bypass whereby the air delivered under pressure from the blower to the engine is preheated to an extent increasing as the quantity of air re-circulated through the blower is increased and the quantity of air supplied to the engine is reduced.

2. The combination according to claim 1, in which the hot spot is provided by a jacket for the blower bypass, heated by the engine exhaust.

3. The combination according to claim 1, in which the blower is a positive displacement blower driven from the engine.

4. The combination according to claim 1, in which the valve means includes an engine throttle valve between the blower and the engine, and a bypass throttle valve in the bypass which is connected to the outlet side of the blower between the blower and the engine throttle valve, said throttle valves being interconnected in such a way that as one is closed the other is opened and vice versa.

5. The combination according to claim 1, in which there is a spring loaded valve in the bypass, said valve and its spring being such that no air is bypassed until the blower outlet pressure exceeds a certain minimum determined by the closing pressure of the spring.

6. The combination according to claim 1, in which a spring loaded valve in the bypass prevents the passage of air therethrough until the blower pressure exceeds a certain minimum, the opening pressure of said valve being adjustable.

7. In a two-cycle internal combustion engine in combination, a positive displacement blower driven from the engine, an engine throttle valve between the blower and the engine, a bypass from between the blower and the engine throttle valve to the inlet side of the blower, a bypass throttle valve in the bypass, said throttle valves being interconnected in such a way that as one is closed the other is opened and vice versa, a spring loaded valve in the bypass to prevent the passage of air therethrough until the blower pressure exceeds a certain minimum and an exhaust heated "hot spot" in the bypass.

MARION L. FAST.